United States Patent
Johannsen et al.

(10) Patent No.: US 8,613,486 B2
(45) Date of Patent: Dec. 24, 2013

(54) BUSHING FOR A TRACK-TYPE UNDERCARRIAGE

(75) Inventors: Eric J. Johannsen, Washington, IL (US); Mark S. Diekevers, Metamora, IL (US)

(73) Assignee: Caterpillar Inc., Peoria, IL (US)

( * ) Notice: Subject to any disclaimer, the term of this patent is extended or adjusted under 35 U.S.C. 154(b) by 489 days.

(21) Appl. No.: 12/939,537

(22) Filed: Nov. 4, 2010

(65) Prior Publication Data

US 2011/0109154 A1 May 12, 2011

Related U.S. Application Data

(60) Provisional application No. 61/259,276, filed on Nov. 9, 2009.

(51) Int. Cl.
*B62D 55/12* (2006.01)
*B21L 3/00* (2006.01)

(52) U.S. Cl.
USPC .......................... 305/201; 305/118; 305/198

(58) Field of Classification Search
USPC ............. 305/102–103, 105, 117, 196, 198, 305/200–201, 118
See application file for complete search history.

(56) References Cited

U.S. PATENT DOCUMENTS

| | | | |
|---|---|---|---|
| 2,882,103 A | 4/1959 | Johnson et al. | |
| 3,680,924 A * | 8/1972 | Otto et al. | 305/102 |
| 3,759,586 A * | 9/1973 | Otto et al. | 305/102 |
| 4,199,199 A | 4/1980 | Granda | |
| 5,032,192 A | 7/1991 | Tsuchiya et al. | |
| 5,711,586 A | 1/1998 | Anderton et al. | |
| 6,045,200 A | 4/2000 | Anderton et al. | |
| 6,382,742 B1 | 5/2002 | Hasselbusch et al. | |
| 6,485,116 B1 | 11/2002 | Oertley | |
| 6,846,051 B2 | 1/2005 | Bottom et al. | |
| 7,354,200 B2 | 4/2008 | Yamamoto et al. | |
| 7,374,257 B2 | 5/2008 | Oertley | |
| 7,481,582 B2 | 1/2009 | Yamamoto et al. | |
| 8,070,241 B2 * | 12/2011 | Mulligan | 305/196 |

FOREIGN PATENT DOCUMENTS

| | | |
|---|---|---|
| JP | 2006219127 | 8/2006 |
| WO | 9413525 | 6/1994 |

OTHER PUBLICATIONS

Higdon, Mechanics of Material, Jan. 1985, pp. 570-571, Fourth Edition, John Wiley and Sons, Inc., New York, USA.
Juvinall, Engineering Considerations of Stress, Strain, and Strength, Jun. 1967, pp. 370-373, McGraw-Hill Book Company, USA.

* cited by examiner

*Primary Examiner* — Jason Bellinger
(74) *Attorney, Agent, or Firm* — Steven M. Hanley

(57) ABSTRACT

A bushing for use in a tracked undercarriage of a track-type machine includes a first end and a second end disposed opposite the first end. An outer surface extends between the first end and the second end and is shaped to engage a sprocket of the tracked undercarriage. The bushing also includes an annular inner surface disposed between the first end and the second end defining an internal cavity shaped to receive a track pin. An innermost portion of the inner surface forms a crown having a radius less than or equal to $(PL^2)/[(24 E \pi DR_{Bush}^4)(1-\cos[(PL)/(16 E \pi DR_{Bush}^4)])]$ where L is the length of the bushing, P is the weight of the track-type machine, E is the Modulus of Elasticity of the bushing, and $R_{Bush}$ is a radius of the innermost portion of the annular internal cavity.

20 Claims, 4 Drawing Sheets

BUSHING FOR A TRACK-TYPE UNDERCARRIAGE

TECHNICAL FIELD

This invention relates generally to a track chain for a track laying work machine and, more particularly, to an anti galling arrangement for the pin and bushing of such a track chain.

BACKGROUND

Galling between the bushing and the track pin is a persistent problem in the track chains of tracked undercarriages. For example, U.S. Pat. No. 2,882,103 to Johnson et al. and patented in Apr. 14, 1959 attempted to solve this problem by including a chamfered portion inside each end of the bushing. While providing some benefit, galling problems between the pin and bushing have continued and been compounded by ever greater loads transmitted between the bushing and the track pin because of ever larger and more powerful machines. Specifically during use, the loads applied to the bushing and track pin cause the track pin to bend. The curvature of the track pin engages the edge of the chamfer such that edge loading can occur and result in galling and potentially premature failure. This edge loading between the track pin and the inner surface of the bushing is exacerbated by the greater loads transmitted through the interface between the track pin and bushing by ever larger, heavier equipment.

More recently, U.S. Pat. No. 6,846,051 to Bottom et al., patented on Jan. 25, 2005, attempted to solve this galling problem through the use of a free floating crown shaped insert. As stated in its abstract, "the crown shaped surface directs forces to the center of the insert to reduce edge loading." While reducing edge loading, U.S. Pat. No. 6,846,051 has not solved the problem of edge loading which still occurs between the bushing and the track pin and continues to be a persistent problem in the track chains of tracked undercarriages, especially in the tracked undercarriages of ever larger machines.

SUMMARY OF THE INVENTION

A bushing for use in a track chain of a tracked undercarriage of a machine includes a first end and a second end disposed opposite the first end. An outer surface extends between the first end and the second end and is shaped to engage a sprocket of the tracked undercarriage. The bushing also includes an annular inner surface disposed between the first end and the second end defining an internal cavity shaped to receive a track pin. An innermost portion of the inner surface forms a crown having a radius greater than or equal to 100 millimeters.

DETAILED DESCRIPTION

As used herein, the term "about" means +/−10% of a given value.

Figure 1:
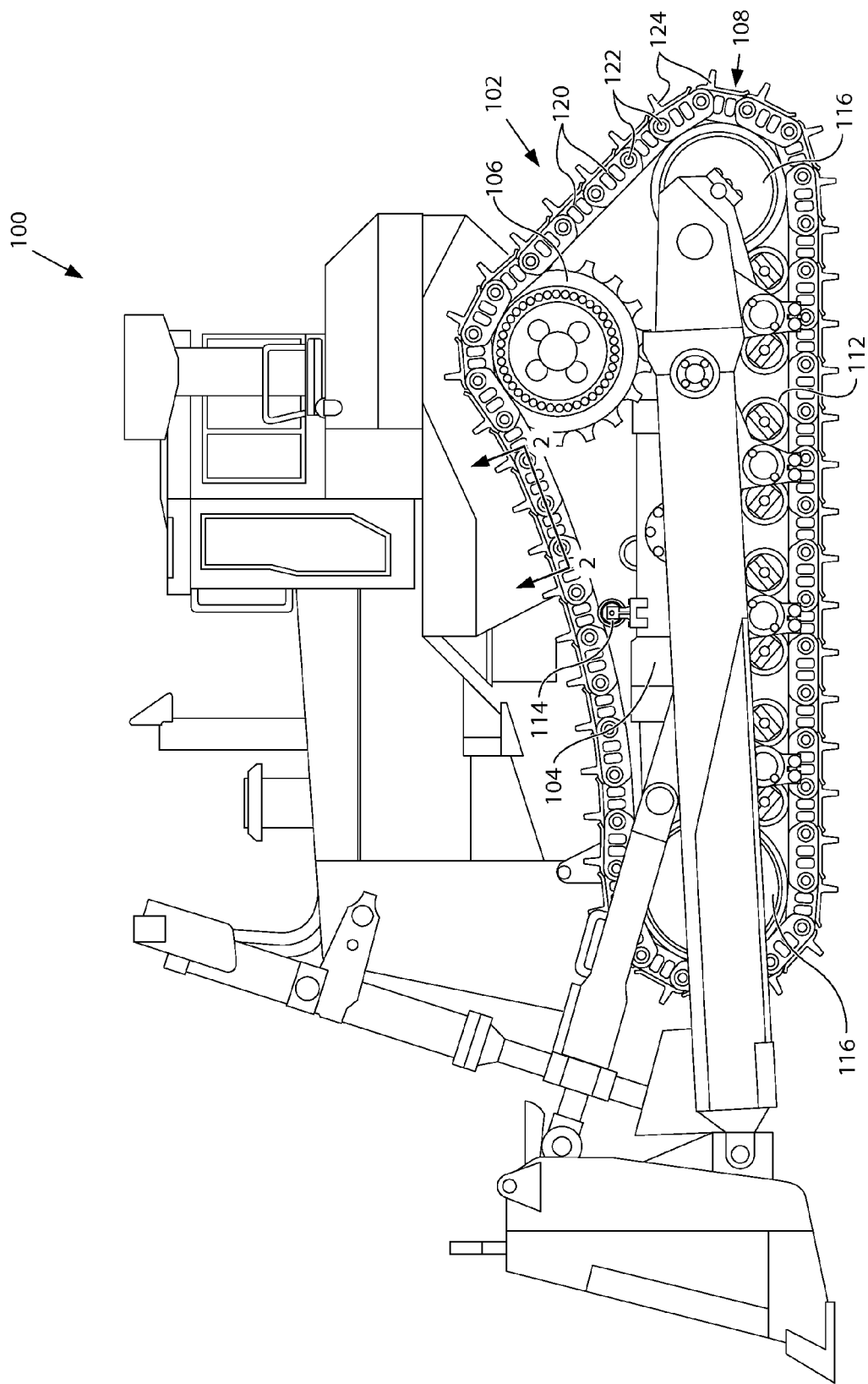
FIG. 1 is a side view of a machine having a tracked undercarriage.

Referring to FIG. 1, a side view illustrates a machine 100 having a tracked undercarriage 102. As shown, the tracked undercarriage 102 may include a roller frame 104, a sprocket 106, and a track chain 108 entrained about the roller frame 104 and the sprocket 106. A power source such as an electric motor, hydraulic motor, or engine may be used to actuate the sprocket 106, which engages the track chain 108 and moves the track chain about the roller frame 104. The roller frame 104 may include a plurality of rollers or bogeys 112, carrier rollers 114, and idlers 116 that support and guide the track chain 108 as it moves about the roller frame 104 to move the machine 100.

A plurality of track links 120 pivotally connected together with a plurality of track pins 122 to form the track chain 108. A track shoe 124 may be attached to each track link 120.

Figure 2:
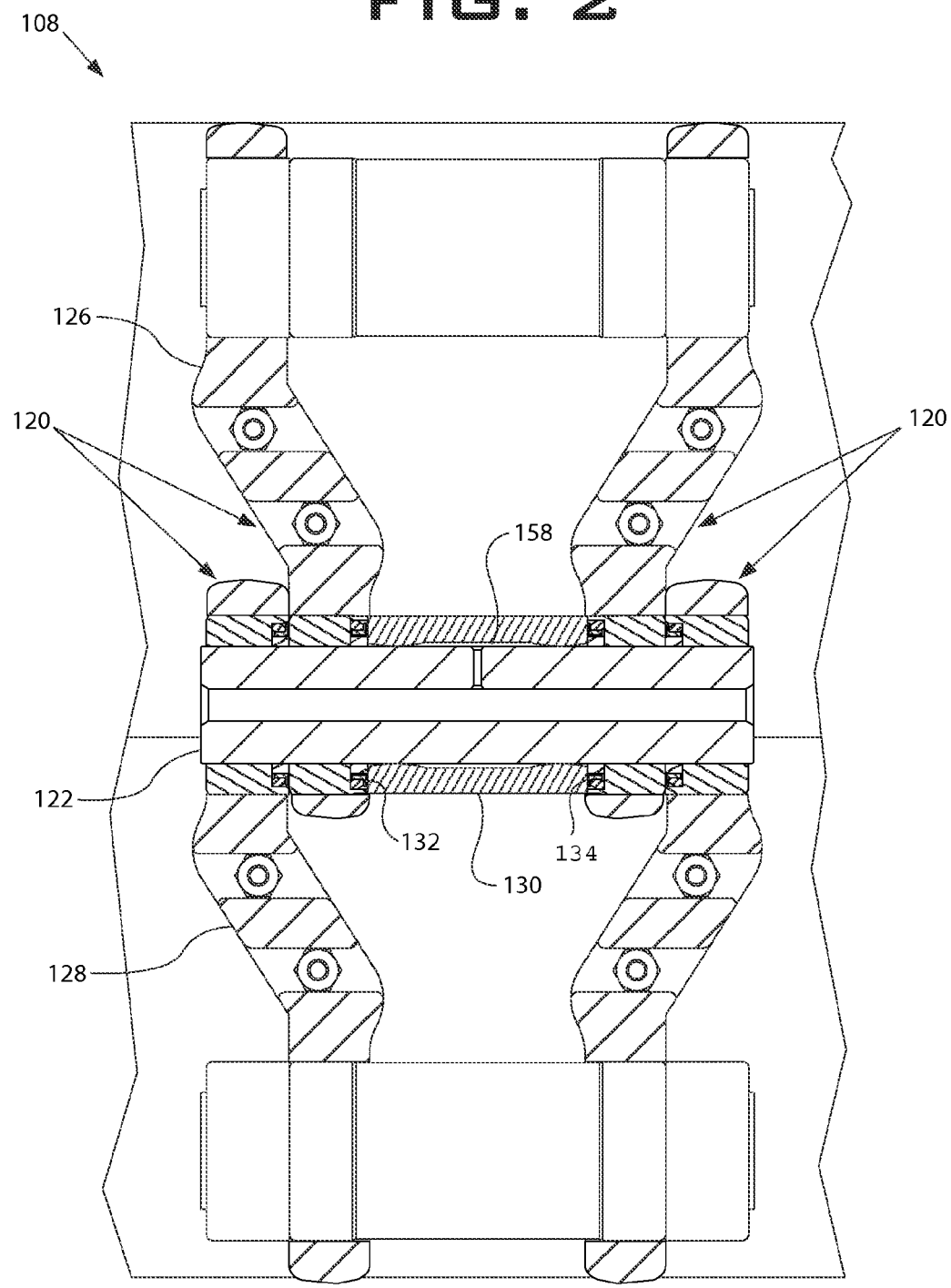
FIG. 2 is a cross section taken along line 2-2 of FIG. 1 showing a portion of the track chain of the tracked undercarriage.

Referring to FIG. 2, a cross section taken along line 2-2 of FIG. 1 illustrates a portion of the track chain 108. As shown, a first track link 126 and a second track link 128 of the plurality of track links 120 are pivotally connected and disposed about one of the track pins 122.

A bushing 130 may be disposed on each track pin 122 of the track chain 108. As shown, the bushing 130 may be centrally located on the track pin 122 between two sets of track links 120 when assembled on the track pin 122 and is able to rotate about the track pin 122. As the sprocket 106 (shown in FIG. 1) is rotated by the power source, the sprocket 106 engages the bushings 130 to move the track chain 108 about the roller frame 104 (shown in FIG. 1) and thus, move the machine 100 (shown in FIG. 1).

Figure 3:
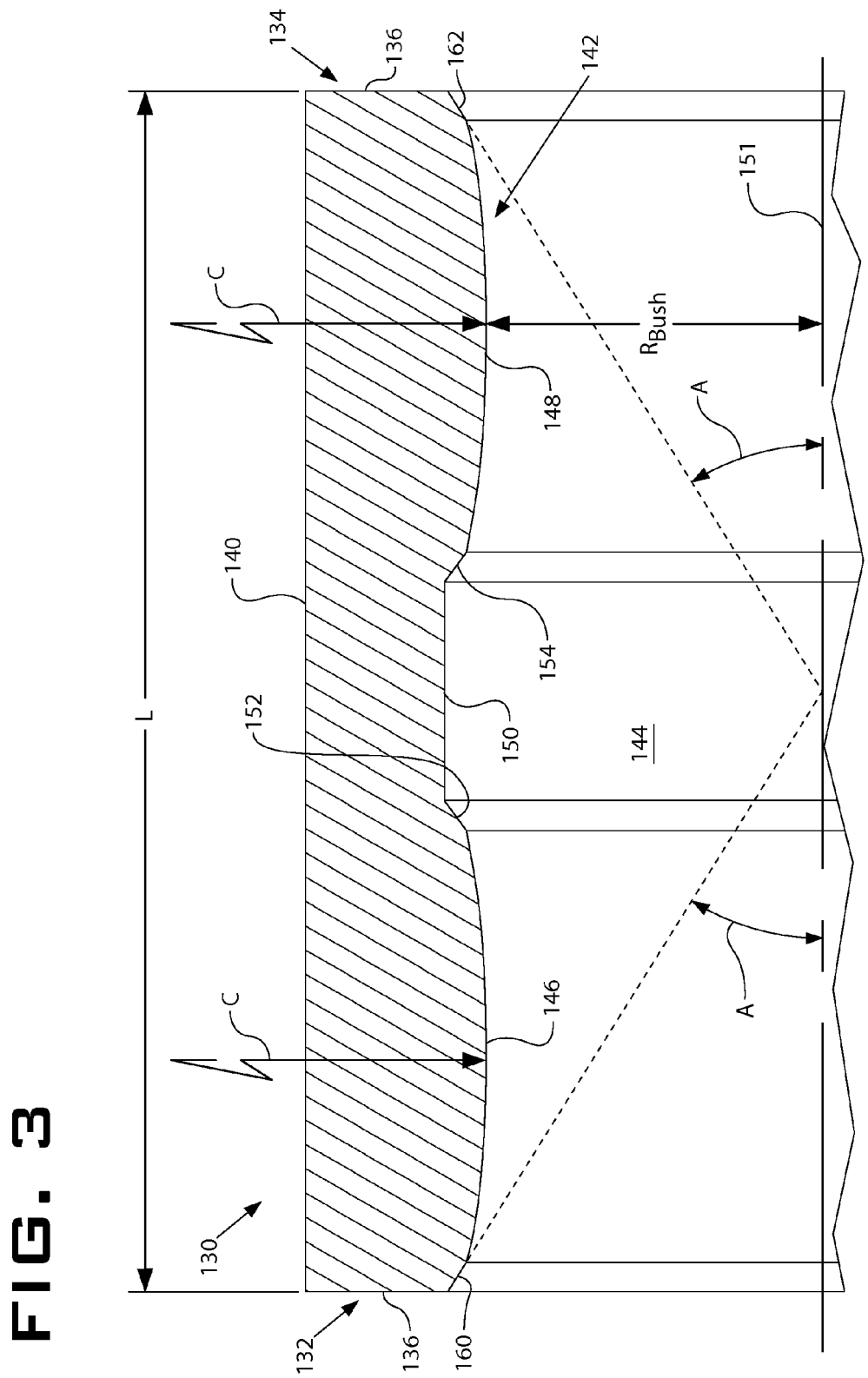
FIG. 3 is a broken cross section of the bushing of the track chain shown in isolation.

Referring to FIG. 3, a broken cross section of the bushing 130 is shown in isolation. The bushing 130 includes a first end 132 and a second end 134 disposed opposite the first end 132. The first end 132 and the second end 134 may be hardened, coated, or include an inlay of material to provide wear resistant sealing surfaces 136 that engage seals 138 (shown in FIG. 2).

An outer surface 140 extending between the first end 132 and the second end 134 is shaped to engage the sprocket 106 of the tracked undercarriage 102 (shown in FIG. 1). While it is shown in the drawings as having an annular shape being concentric with the axis 151 of rotation optionally, the outer surface 140 may have other shapes such as a nonconcentric profile.

An inner surface 142 extends between the first end 132 and the second end 134 and defines an annular internal cavity 144 shaped to receive one of the track pins 122. The innermost portions of the inner surface 142 are provided by a first crown 146 disposed adjacent the first end 132 and a second crown 148 disposed adjacent the second end 134. The first and second crowns 146, 148 may each have a radius C ranging between about Y to about Z where Y is the smallest radius and Z is the largest radius of the crown that may be used to prevent edge loading in a tracked undercarriage between the bushing 130 and the track pin 122. More specifically, Z may be determined from the following equation:

$$Z=(PL^2)/[(24E\pi DR_{Bush}^4)(1-\cos[(PL)/(16E\pi DR_{Bush}^4)])]$$

L is the length of the bushing, P is the weight of the machine, E is the Modulus of Elasticity of the material of the bushing, $R_{Bush}$ is the smallest radius of the cavity of the bushing and D is the mass per unit volume of the material of the bushing.

Y is found by solving the following equation for Y:

$$\rho_o = 3P/[4\pi[-1.8454Ln(\cos^{-1}[(Y((1/R_{Bush})^2+((1/Y)+(1/R_{Bush}))^2+2(1/R_{Bush})((1/R_{Bush})+(1/Y))))^{\wedge}(1/2)])+ \\ 8.9733]*[0.0074(\cos^{-1}[(Y((1/R_{Bush})^2+((1/Y)+(1/R_{Bush}))^2+2(1/R_{Bush})((1/R_{Bush})+(1/Y))))^{\wedge}(1/2)])+ \\ 0.271]*(9.09*10^{-8}*P*Y)^{\wedge}(2/3)]$$

$\rho_o$ is the maximum pressure the material of the track pin or bushing may experience before plastic deformation occurs.

Therefore, in some tracked machine configurations, the radius C of the crowns 146, 148 may be greater than or equal to 100 millimeters. In another configuration, the first and second crowns 146, 148 may have a radius C ranging from 150 millimeters to 6000 millimeters. Alternatively, the first and second crowns 146, 148 may have a radius C ranging from 1900 millimeters to 4100 millimeters or 3100 millimeters. Further, the first and second crowns 146, 148 may have a radius C greater than 1900 millimeters and in some configurations, the radius C may be greater than 2100 millimeters. In other configurations, the first and second crowns 146, 148 may have a radius greater than about 14 times the length of the bushing.

As shown in FIG. 3, the centers of the radii of the first and second crowns are disposed about at the middle of each halves of the length of the bushing.

The internal cavity 144 may include a middle portion 150 disposed between the first crown 146 and the second crown 148. The middle portion 150 may extend generally parallel to a central axis 151 of the internal cavity 144 with the inner surface 142 uninterruptedly extending from the middle portion 150 to the first crown 146 and the second crown 148. A first transition portion 152 may extend inwardly from the middle portion 150 to the first crown 146 and a second transition portion 154 that extends inwardly from the middle portion 150 to the second crown 148.

When assembled, the circular profile of the internal cavity 144 may permit the bushing 130 and the track pin 122 to rotate relative to each other. A gap 158 (shown in FIG. 2) may be provided between the middle portion 150 and the track pin 122. The gap 158 may act as a lubricant reservoir for holding excess lubricant used to facilitate movement of the first and second track links 126, 128 and bushing 130 relative to the track pin 122.

Optionally, a first chamfer 160 may extend from the first crown 146 to the first end 132 and a second chamfer 162 may extend from the second crown 148 to the second end 134. In some configurations, the first and second chamfers 160, 162 may extend at angle A ranging between five degrees and fifty degrees from the central axis. Alternatively, the first and second chamfers 160, 162 may extend at angle A ranging between eight degrees and twelve degrees from the central axis. The first and second chamfers 160, 162 may facilitate insertion of the track pin 122 within the internal cavity 144 of the bushing 130.

Optionally, the first and second crowns 146, 148 may be hardened, coated, or include a layer of material to provide a wear resistant surface.

Figure 4:
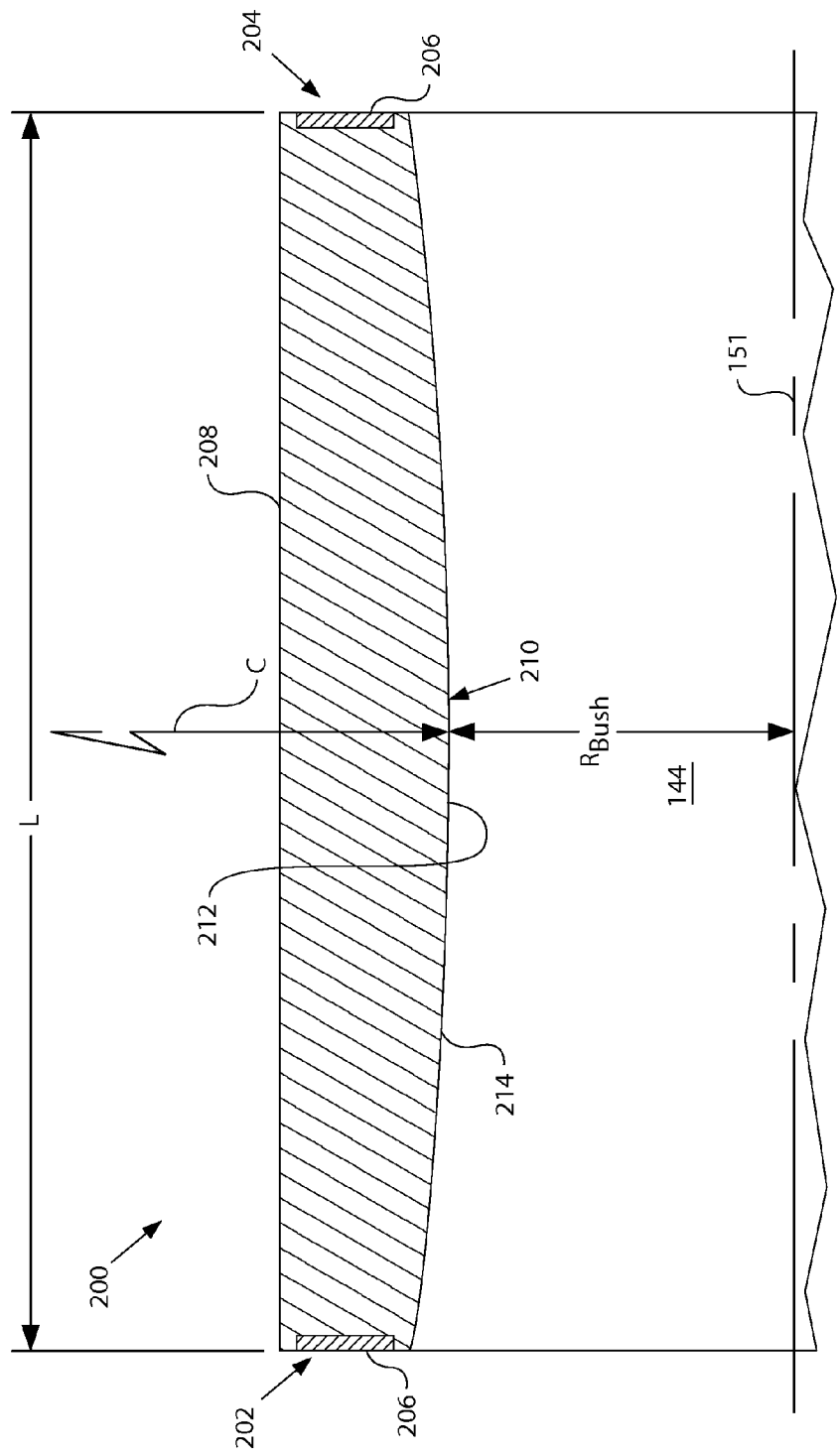
FIG. 4 is a broken cross section of an alternative bushing for use with the track chain shown in isolation.

FIG. 4 is a broken cross section of an alternative bushing 200 for use with the track chain 108 shown in isolation. Like the bushing 130 of FIG. 3, the bushing 200 includes a first end 202 and a second end 204 disposed opposite the first end 202. The first and second ends 202, 204 may include wear resistant sealing surfaces 206 that engage seals 138 (shown in FIG. 2). As shown, the wear resistant sealing surfaces 206 may optionally include an inlay of a hard, wear resistant material. Alternatively, the wear resistant sealing surfaces 206 may hardened native material of the bushing 200 or may include a hard wear resistant coating.

An outer surface 208 for engaging the sprocket 106 (shown in FIG. 1) extends between the first end 202 and the second end 204.

Opposite the outer surface 208, an annular inner surface 210 defines an internal cavity 144 shaped to receive one of the track pins 122 (shown in FIG. 2). As shown, the inner surface 210 includes a middle portion 212, across which, a single crown 214 extends. In other words, the crown 214 extends from adjacent the first end 202 to adjacent the second end 204. In this embodiment, the crown 214 may have a radius C ranging between about 2 Y to about Z. Thus, in some configurations, the radius C may be greater than or equal to 500 millimeters. In another configuration, the crown 214 may have a radius C greater than or equal to 1000 millimeters and in others, the radius C may be greater than 1500 millimeters or 2500 millimeters. The crown 214 may have a radius C ranging from about 2000 millimeters to 6000 millimeters. Alternatively, the crown 214 may have a radius greater than or equal to about 14 times the length of the bushing.

The center of the radius of the crown 214 may be disposed at or near the middle of the length L of the bushing. Additionally, the crown 214 may optionally be hardened, coated, or include a layer of material to provide a wear resistant surface.

INDUSTRIAL APPLICABILITY

Machines having a tracked undercarriage may include but are not limited to track-type tractors, hydraulic excavators, tracked loaders, multi-terrain loaders, as well as other types of earth moving and forestry equipment. During the use of tracked undercarriages, galling may occur between the bushing and track pin, which may lead to premature failure of the track pin and bushing. More specifically, the track pin may bend between the two sets of track links forming the track chain during use causing edge contact between the bushing and the track pin. To prevent or minimize edge contact and thus, the resulting galling problems that have continued to persist, one or more large radius internal annular crowns are provided on the internal surface of a bushing. This has been shown to reduce galling between the bushing and the track pin when heavy loads are applied.

While sealing surfaces and the shape of the outer surface of the bushing have been discussed above, the sealing surfaces are not necessary to obtain the benefit of the crowned internal surface. Further, any shape of the external surface of the bushing may be used. For example, the external surface may include a plurality of axially extending lobes that may be used to provide improved noise performance.

What is claimed is:
1. A bushing for use in a tracked undercarriage of a track-type machine comprising:
   a first end;
   a second end disposed opposite the first end, the bushing having a length extending from the first end to the second end;
   an outer surface disposed between the first end and the second end, wherein the outer surface is shaped to engage a sprocket of the tracked undercarriage; and
   an inner surface disposed between the first end and the second end, the inner surface defining an annular internal cavity shaped to receive a track pin, wherein an innermost portion of the inner surface forms a crown having a radius less than or equal to $(PL^2)/[(24E\pi\text{-}DR_{Bush}^4)(1-\cos[(PL)/(16E\pi DR_{Bush}^4)])]$ where L is the length of the bushing, P is the weight of the track-type machine, E is the Modulus of Elasticity of the bushing, and $R_{Bush}$ is a radius of the innermost portion of the annular internal cavity.

2. The bushing of claim 1, wherein the crown is a first crown disposed adjacent the first end, the inner surface further including a second crown disposed adjacent the second end, wherein the second crown has a radius about equal to the radius of the first crown.

3. The bushing of claim 2, wherein the internal cavity includes a middle portion disposed between the first crown and the second crown, wherein the inner surface includes a first transition portion that extends inwardly from the middle portion to the first crown and a second transition portion that extends inwardly from the middle portion to the second crown.

4. The bushing of claim 2, wherein the inner surface includes a middle portion extending generally parallel to a central axis of the internal cavity, the crown being disposed adjacent to the middle portion, wherein the inner surface uninterruptedly extends from the middle portion to the first crown and the second crown.

5. The bushing of claim 2, wherein the radii of the first and second bushing is equal to or greater than Y, where Y is derived from $\rho o = 3P/[4\pi[-1.8454 Ln(cos-1[(Y((1/RBush)^2+((1/Y)+(1/RBush))^2+2(1/RBush)((1/RBush)+(1/Y))))^{1/2}])+8.9733]*[0.0074(cos-1[(Y((1/RBush)^2+((1/Y)+(1/RBush))^2+2(1/RBush)((1/RBush)+(1/Y))))^{1/2}])+0.271]*(9.09*10^{-8}*P*Y)^{2/3}]$ where L is the length of the bushing, P is the weight of the machine, E is the Modulus of Elasticity of the bushing, $R_{Bush}$ is the smallest radius of the cavity of the bushing, D is the mass per unit volume of the material of the bushing, and $\rho_o$ is the maximum pressure the material of the track pin or bushing may experience before plastic deformation occurs.

6. The bushing of claim 2, wherein the centers of the radii of the first and second crowns are disposed about at the middle of each halves of the length of the bushing.

7. The bushing of claim 1, wherein the crown has a radius ranging from 100 millimeters to 6000 millimeters.

8. The bushing of claim 1, wherein the inner surface includes a middle portion, wherein the crown extends across the middle portion.

9. The bushing of claim 8, wherein the radii of the bushing is equal to or greater than Y, where Y is derived from $\rho o = 3P/[4\pi[-1.8454 Ln(cos-1[(Y((1/RBush)^2+((1/Y)+(1/RBush))^2+2(1/RBush)((1/RBush)+(1/Y))))^{1/2}])+8.9733]*[0.0074(cos-1[(Y((1/RBush)^2+((1/Y)+(1/RBush))^2+2(1/RBush)((1/RBush)+(1/Y))))^{1/2}])+0.271]*(9.09*10^{-8}*P*Y)^{2/3}]$ where L is the length of the bushing, P is the weight of the machine, E is the Modulus of Elasticity of the bushing, $R_{Bush}$ is the smallest radius of the cavity of the bushing, D is the mass per unit volume of the material of the bushing, and $\rho_o$ is the maximum pressure the material of the bushing may experience before plastic deformation occurs.

10. A tracked undercarriage comprising:
a roller frame;
a sprocket; and
a track chain entrained about the roller frame and the sprocket, wherein a portion of the track chain includes a track pin, a bushing, a first track link, and a second track link pivotally moveable relative to the first track link, wherein the bushing, the first track link, and the second track link are disposed about the track pin, the bushing including a first end, a second end disposed opposite the first end, and an outer surface disposed between the first end and the second end, wherein the outer surface is shaped to engage the sprocket of the tracked undercarriage, the bushing further including an inner surface disposed between the first end and the second end, the inner surface defining an annular internal cavity shaped to receive the track pin, wherein an innermost portion of the inner surface forms a crown having a radius in the range of about 100 millimeters to less than 7000 millimeters.

11. The tracked undercarriage of claim 10, wherein the crown is a first crown disposed adjacent the first end, the inner surface further including a second crown disposed adjacent the second end.

12. The tracked undercarriage of claim 11, wherein the internal cavity includes a middle portion disposed between the first crown and the second crown, wherein the inner surface includes a first transition portion that extends inwardly from the middle portion to the first crown and a second transition portion that extends inwardly from the middle portion to the second crown.

13. The tracked undercarriage of claim 12, wherein the middle portion extends generally parallel to a central axis of the internal cavity, wherein the inner surface uninterruptedly extends from the middle portion to the first crown and the second crown.

14. The tracked undercarriage of claim 13, further comprising a first chamfer extending from the first crown to the first end and a second chamfer extending from the second crown to the second end, wherein the first and second chamfers each extend at angle ranging between eight degrees and twelve degrees from the central axis.

15. The tracked undercarriage of claim 10, wherein the crown has a radius ranging from 190 millimeters to 3100 millimeters.

16. The tracked undercarriage of claim 15, wherein the crown has a radius ranging from 1900 millimeters to 2600 millimeters.

17. The tracked undercarriage of claim 10, wherein the inner surface includes a middle portion, wherein the crown extends across the middle portion.

18. The tracked undercarriage of claim 17, wherein the crown has a radius greater than 1000 millimeters.

19. The tracked undercarriage of claim 18, wherein the crown has a radius greater than 1900 millimeters.

20. The tracked undercarriage of claim 10, wherein the crown has a radius greater than or equal to about 14 times the length of the bushing.

* * * * *

UNITED STATES PATENT AND TRADEMARK OFFICE
CERTIFICATE OF CORRECTION

PATENT NO.        : 8,613,486 B2                                       Page 1 of 1
APPLICATION NO.   : 12/939537
DATED             : December 24, 2013
INVENTOR(S)       : Johannsen et al.

It is certified that error appears in the above-identified patent and that said Letters Patent is hereby corrected as shown below:

In the Specification

Column 1, line 66, delete "means+/-10%" and insert -- means +/-10% --.

Column 4, line 11, delete "2 Y" and insert -- 2Y --.

In the Claims

Column 5, lines 24-28, in Claim 5, delete "ρo=3P/[4π[-1.8454Ln(cos-1[(Y((1/RBush)$^2$+((1/Y)+(1/RBush))$^2$+2(1/RBush)((1/RBush)+(1/Y))))$^{1/2}$])+8.9733]*[0.0074(cos-1[(Y((1/RBush)$^2$+((1/Y)+(1/RBush))$^2$+2(1/RBush)((1/RBush)+(1/Y))))$^{1/2}$])+0.271]*(9.09*10$^{-8}$*P*Y)$^{2/3}$]" and insert -- $\rho_o$=3P/[4π[-1.8454Ln(cos$^{-1}$[(Y((1/R$_{Bush}$)$^2$+((1/Y)+(1/R$_{Bush}$))$^2$+2(1/R$_{Bush}$)((1/R$_{Bush}$)+(1Y))))$^{1/2}$])+8.9733]*[0.0074(cos$^{-1}$[(Y((1/R$_{Bush}$)$^2$+((1/Y)+(1/R$_{Bush}$))$^2$+2(1/R$_{Bush}$)((1/R$_{Bush}$)+(1/Y))))$^{1/2}$])+0.271]*(9.09*10$^{-8}$*P*Y)$^{2/3}$] --.

Column 5, lines 24-28, in Claim 9, delete "ρo=3P/[4π[-1.8454Ln(cos-1[(Y((1/RBush)$^2$+((1Y)+(1/RBush))$^2$+2(1/RBush)((1/RBush)+(1/Y))))$^{1/2}$])+8.9733]*[0.0074(cos-1[(Y((1/RBush)$^2$+((1/Y)+(1/RBush))$^2$+2(1/RBush)((1/RBush)+(1/Y))))$^{1/2}$])+0.271]*(9.09*10$^{-8}$*P*Y)$^{2/3}$]" and insert -- $\rho_o$=3P/[4π[-1.8454Ln(cos$^{-1}$[(Y((1/R$_{Bush}$)$^2$+((1/Y)+(1/R$_{Bush}$))$^2$+2(1/R$_{Bush}$)((1/R$_{Bush}$)+(1/Y))))$^{1/2}$])+8.9733]*[0.0074(cos$^{-1}$[(Y((1/R$_{Bush}$)$^2$+((1/Y)+(1/R$_{Bush}$))$^2$+2(1/R$_{Bush}$)((1/R$_{Bush}$)+(1/Y))))$^{1/2}$])+0.271]*(9.09*10$^{-8}$*P*Y)$^{2/3}$] --.

Signed and Sealed this
Eighth Day of September, 2015

Michelle K. Lee
*Director of the United States Patent and Trademark Office*